(12) United States Patent
Uehara

(10) Patent No.: US 9,454,150 B2
(45) Date of Patent: Sep. 27, 2016

(54) INTERACTIVE AUTOMATED DRIVING SYSTEM

(71) Applicant: Toyota Motor Engineering & Manufacturing North America, Inc., Erlanger, KY (US)

(72) Inventor: Yasuo Uehara, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/944,805

(22) Filed: Jul. 17, 2013

(65) Prior Publication Data

US 2015/0025731 A1   Jan. 22, 2015

(51) Int. Cl.
| | |
|---|---|
| *G05D 1/00* | (2006.01) |
| *B60W 50/08* | (2012.01) |
| *B60W 50/10* | (2012.01) |
| *B60W 50/14* | (2012.01) |
| *B60W 50/00* | (2006.01) |

(52) U.S. Cl.
CPC .............. *G05D 1/00* (2013.01); *B60W 50/082* (2013.01); *B60W 50/10* (2013.01); *B60W 50/14* (2013.01); *B60W 2050/0005* (2013.01); *B60W 2050/0083* (2013.01); *B60W 2050/0094* (2013.01); *B60W 2050/0095* (2013.01); *B60W 2540/04* (2013.01); *B60W 2540/28* (2013.01)

(58) Field of Classification Search
CPC .................. B60W 2050/0083; B60W 20/40; B60W 2510/081; B60W 2520/26; G05D 1/00; G05D 1/0061; G05D 1/0238
See application file for complete search history.

(56) References Cited

U.S. PATENT DOCUMENTS

| | | | |
|---|---|---|---|
| 5,165,497 A * | 11/1992 | Chi ............................... | 180/169 |
| 5,197,562 A * | 3/1993 | Kakinami et al. ............ | 180/169 |
| 6,836,719 B2 | 12/2004 | Andersson et al. | |
| 8,810,383 B2 * | 8/2014 | Lippman et al. .............. | 340/438 |
| 2005/0259033 A1* | 11/2005 | Levine ............... | 345/7 |
| 2009/0005929 A1 | 1/2009 | Nakao et al. | |
| 2009/0062987 A1* | 3/2009 | Kim et al. ...................... | 701/41 |
| 2011/0095879 A1 | 4/2011 | Heracles et al. | |
| 2011/0137520 A1* | 6/2011 | Rector .............. | H04M 1/72577 701/36 |
| 2011/0241862 A1 | 10/2011 | Debouk et al. | |

* cited by examiner

*Primary Examiner* — Mussa A Shaawat
*Assistant Examiner* — Abdhesh Jha
(74) *Attorney, Agent, or Firm* — Christopher G. Darrow; Darrow Mustafa PC

(57) ABSTRACT

A system, device, and methods of interactive automated driving are disclosed. One example method includes receiving a current value from one or more sensors disposed on a vehicle and determining a current vehicle state based on the current value. The method also includes generating a target vehicle state based on the current vehicle state and including a range of target values and generating a desired vehicle state. The desired vehicle state includes a desired value based on one or more driver inputs received at one or more vehicle interfaces. If the desired value falls inside the range of target values, the method also includes sending a command to one or more vehicle systems to change the vehicle state from the target vehicle state to the desired vehicle state.

18 Claims, 3 Drawing Sheets

INTERACTIVE AUTOMATED DRIVING SYSTEM

BACKGROUND

Partially-automated or monitored driving systems are designed to assist drivers in operating a vehicle safely and efficiently on the road, for example, using techniques such as eye-tracking of the driver to send a warning when the driver becomes inattentive, lane tracking of the vehicle to send a warning to the driver when the vehicle is leaving its lane, and controlling vehicle velocity based on distance to a vehicle ahead of the driver when adaptive cruise control is activated by the driver. Fully automated driving systems are designed to operate a vehicle on the road without driver interaction or other external control, for example, self-driving vehicles.

SUMMARY

An interactive automated driving system can be described as a fully automated driving system that can operate a vehicle on the road without driver interaction, accept driver inputs that modify the behavior of the automated driving system, and prohibit changes to the automated driving system if a given driver input (e.g., pressing accelerator or brake pedal, turning steering wheel) would cause one or more measured vehicle values (e.g. velocity, acceleration, deceleration, distance to objects, vehicle location, vehicle orientation) to fall outside of one or more ranges of target values specific to an identified driver (e.g. teen, recently-licensed, restricted-license). The interactive automated driving system can also update the ranges of target values based on receiving the same types of driver inputs over time, effectively learning the preferences of a given driver.

The interactive automated driving system described here can autonomously operate the vehicle within ranges of target values (e.g. target velocities, accelerations, decelerations, distances to objects, vehicle location, vehicle orientation) given the applicable driving environment, or vehicle state, and type of driver. The interactive automated driving system described here can also receive inputs from the driver of the vehicle indicating the driver's behaviors and desire to change the vehicle state. If the interactive automated driving system receives such driver inputs, it can update the operation of the vehicle to reflect those inputs so long as the proposed changes lie within the ranges of target values.

For example, a driver can provide an input by pressing an accelerator pedal to indicate the desire to drive more closely to an object in front of the vehicle during stop-and-go traffic. If the resulting closer distance is within a target range of distances, the interactive automated driving system can communicate with one or more vehicle systems to implement the desired change. If the driver provides this type of input several times during a stop-and-go traffic vehicle state, the system can update the autonomous operation of the vehicle, e.g. the ranges of target values, to reflect the desired change from the driver.

In one implementation, an interactive automated driving system is disclosed. The system includes one or more sensors disposed on a vehicle and a computing device in communication with the one or more sensors. The computing device includes one or more processors for controlling the operations of the computing device and a memory for storing data and program instructions used by the one or more processors. The one or more processors are configured to execute instructions stored in the memory to: determine a current vehicle state based on a current value captured by the one or more sensors; generate a target vehicle state based on the current vehicle state and including a range of target values; generate a desired vehicle state, the desired vehicle state including a desired value based on one or more driver inputs received at one or more vehicle interfaces; and if the desired value falls inside the range of target values, send a command to one or more vehicle systems to change the vehicle state from the target vehicle state to the desired vehicle state.

In another implementation, a computer-implemented method of interactive automated driving is disclosed. The method includes receiving, from one or more sensors disposed on a vehicle, a current value; determining a current vehicle state based on the current value; generating a target vehicle state based on the current vehicle state and including a range of target values; generating a desired vehicle state, the desired vehicle state including a desired value based on one or more driver inputs received at one or more vehicle interfaces; and if the desired value falls inside the range of target values, sending a command to one or more vehicle systems to change the vehicle state from the target vehicle state to the desired vehicle state.

In another implementation, a computing device is disclosed. The computing device includes one or more processors for controlling the operations of the computing device and a memory for storing data and program instructions used by the one or more processors. The one or more processors are configured to execute instructions stored in the memory to: receive, from one or more sensors disposed on a vehicle, a current value; determine a current vehicle state based on the current value; generate a target vehicle state based on the current vehicle state and including a range of target values; generate a desired vehicle state, the desired vehicle state including a desired value based on one or more driver inputs received at one or more vehicle interfaces; and if the desired value falls inside the range of target values, send a command to one or more vehicle systems to change the vehicle state from the target vehicle state to the desired vehicle state.

BRIEF DESCRIPTION OF THE DRAWINGS

The description herein makes reference to the accompanying drawings wherein like reference numerals refer to like parts throughout the several views, and wherein.

DETAILED DESCRIPTION

An interactive automated driving system and methods of implementing the system are described below. The system can include a computing device in communication with one or more sensors disposed on a vehicle. In a method of using the system, the sensors can receive current values corresponding to a current vehicle state, for example, measures of vehicle velocity and vehicle acceleration and deceleration that indicate the vehicle is operating in stop-and-go traffic. The computing device can include a processor configured to generate a target vehicle state with a range of target values and send this to a vehicle system configured to change the vehicle state from the current vehicle state to the target vehicle state if the current values fall outside the range of target values. For example, if the vehicle is operating in start-and-stop traffic, a target range of distances to an object in front of the current vehicle can be generated, and if the vehicle is too close or too far from the object in front of it, the vehicle can be accelerated to close the distance or decelerated to increase the distance.

The processor can be further configured to generate a desired value corresponding to a desired vehicle state based on one or more driver inputs received at the one or more vehicle interfaces. If the desired value falls inside the range of target values, the processor can be configured to send the desired vehicle state to the vehicle system configured to change the vehicle state from the target vehicle state to the desired vehicle state. However, if the desired value falls outside the range of target values, the processor can be configured to send a command to the vehicle system to maintain the target vehicle state or configured to ignore the driver input. For example, if the target state is start-and-stop traffic, and the vehicle is being kept to a three-car-length distance by the interactive automated driving system, the driver can hit the accelerator pedal to bring the vehicle closer, for example, to a two-car-length distance, so long as the two-car-length distance is still within the range of target distances.

If the driver inputs meet a predetermined condition, the processor can be further configured to modify the target vehicle state to reflect the desired vehicle state. Various predetermined conditions are possible. For example, one predetermined condition can be that one of the driver inputs includes a command to update the target vehicle state to reflect the desired vehicle state. Another predetermined condition can be that one of the driver inputs has been received more than a predetermined number of times within a predetermined time period. Finally, another example predetermined condition can be that one of the driver inputs lasts for a predetermined time period during a given vehicle state.

Figure 1:
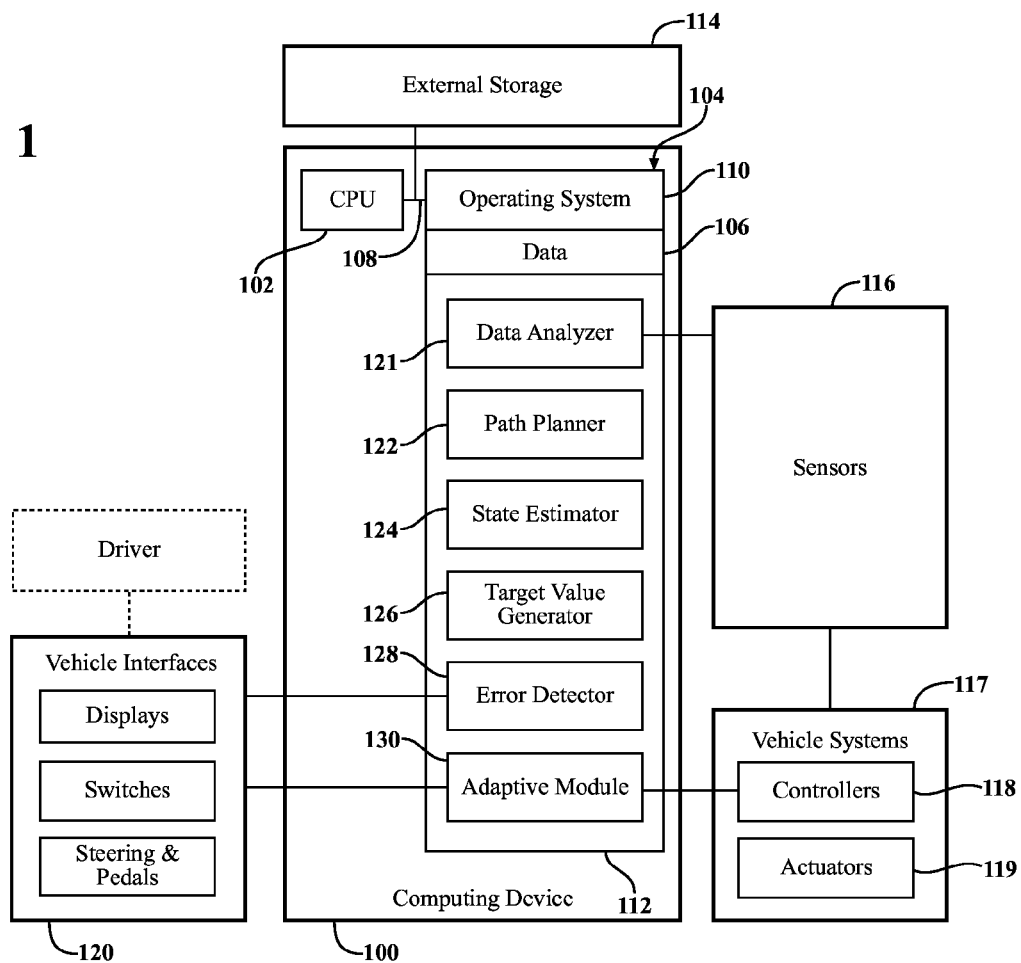
FIG. 1 is a block diagram of a computing device for implementing an interactive automated driving system.

FIG. 1 is a block diagram of a computing device 100 for implementing an interactive automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. The memory 104 in the computing device can be a random access memory device (RAM) or any other suitable type of storage device. The memory can include data 106 that is accessed by the CPU using a bus 108.

The memory 104 can also include an operating system 110 and installed applications 112, the installed applications 112 including programs that permit the CPU 102 to perform the interactive automated driving methods described below. The computing device 100 can also include secondary, additional, or external storage 114, for example, a memory card, flash drive, or any other form of computer readable medium. The installed applications 112 can be stored in whole or in part in the external storage 114 and loaded into the memory 104 as needed for processing.

The computing device can also be coupled to one or more sensors 116. The sensors 116 can capture data and/or signals for processing by an inertial measurement unit (IMU), a dead-reckoning system, a global navigation satellite system (GNSS), a light detection and ranging (LIDAR) system, a driver identification system, a radar system, a sonar system, an image sensor system, or any other type of system capable of capturing objects such as a driver, vehicle, or pedestrian, or other localized position data and/or signals and outputting corresponding data and/or signals to the CPU. If the sensors 116 capture data for a driver identification system, images, audible patterns including speech or other sounds associated with the driver, biometric features, or other individualized presence information can be captured.

The sensors 116 can also capture data representative of changes in x, y, and z-axis position, velocity, acceleration, rotation angle, and rotational angular rate for the vehicle. If the sensors 116 capture data for a dead-reckoning system, data relating to wheel revolution speeds, travel distance, steering angle, and steering angular rate of change can be captured. If the sensors 116 capture signals for a GNSS, a receiver can calculate vehicle position and velocity estimated in global coordinates. A plurality of satellites can be used to estimate the vehicle's position and velocity using three-dimensional triangulation and time estimation. If the sensors 116 capture data for a LIDAR system, ranging data relating to intensity or reflectivity returns of the area surrounding the vehicle can be captured. In the examples described below, the sensors 116 can capture, at least: data for a driver identification system, data for a dead-reckoning system or other system that estimates vehicle velocity, acceleration, deceleration, position, and orientation; signals for a GNSS or other system that determines vehicle position and velocity; and data for a LIDAR system or other system that measures vehicle distance from road lines (e.g., road surface markings or road boundaries), obstacles, or other environmental features including traffic lights and road signs.

The computing device 100 can also be coupled to one or more vehicle systems 117. The vehicle systems 117 can include vehicle controllers 118 and vehicle actuators 119. Each vehicle controller 118 can be configured to send commands to one or more vehicle actuators 119. For example, one vehicle controller 118 can be a propulsion controller configured to send a command to a vehicle actuator 119, e.g. the engine throttle, to move the position of a throttle plate based on the position of an accelerator pedal. In another example, the vehicle actuators 119 can be part of a traction control system or a hybrid control system. As another example, one vehicle controller 118 can be an electronic stability controller configured to send a command to activate one of the front or rear brakes if either more or less yaw motion (rotation around the vehicle's vertical axis) is detected than optimum for the current angle of the steering wheel. The vehicle systems 117 can also be in communication with the sensors 116, the sensors 116 being configured to capture data indicative of performance of the vehicle systems 117.

The computing device 100 can also be coupled to one or more vehicle interfaces 120. The vehicle interfaces 120 allow the driver to send commands to the vehicle controllers 118. For example, one vehicle interface 120 can be an accelerator pedal. When the driver presses the accelerator pedal, one of the sensors 116 can measure the positional change in the accelerator pedal, and this change can be communicated to the propulsion controller. The propulsion controller can then send a command to the engine throttle to change the position of the throttle plate. The vehicle interfaces 120 can also provide feedback to the driver. For example, in the interactive automated driving system described here, if the driver presses the accelerator pedal toward the vehicle floor when the vehicle is already in close proximity to another vehicle in front of it, the system can send a command to the appropriate vehicle controller 118 to provide tactile feedback to the driver using the accelerator pedal. This tactile feedback can be in the form of the accelerator pedal pushing back against the foot of the driver. Other non-limiting examples of vehicle interfaces 120 are the steering wheel, brake pedal, display screen, and audible devices.

In the example computing device 100 described in FIG. 1, the applications 112 stored in the memory 104 include a data analyzer 121, path planner 122, a state estimator 124, a target value generator 126, an error detector 128, and an adaptive module 130. Each of these applications 112 are described in additional detail in respect to FIG. 3 below. In general, data captured by the sensors 116 can be used by one or more of these applications 112 to identify the driver, plan a route for autonomous operation of the vehicle, improve positional accuracy of the vehicle, determine the state of the vehicle, and send commands to change the state of the vehicle. The state of the vehicle can be an indication of the environment in which the vehicle is operating. For example, various vehicle states can include parking, turning, lane-keeping/lane-centering, lane-changing/merging/exiting, cruising, accelerating, decelerating, stop-and-go traffic, etc.

Figure 2:
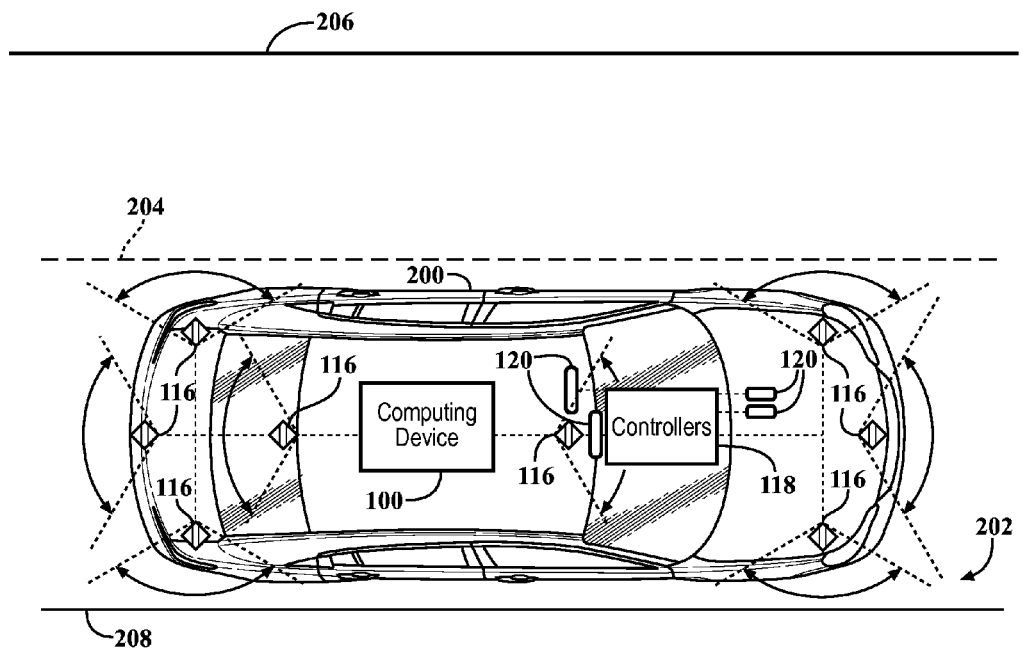
FIG. 2 is a schematic illustration of a vehicle including the computing device of FIG. 1.

FIG. 2 shows a schematic of a vehicle 200 including the computing device 100 described in FIG. 1. The vehicle 200 is traversing a route along a road 202. The road 202 can include line markers such as a center line 204 and edge lines 206, 208. The computing device 100 can be located within the vehicle 200 as shown in FIG. 2 or can be located remotely from the vehicle 200 in an alternate location (not shown). If the computing device 100 is remote from the vehicle, the vehicle 200 can include the capability of communicating with the computing device 100.

The vehicle 200 can include a plurality of sensors, such as the sensors 116 described in reference to FIG. 1. One or more of the sensors 116 shown can be configured to capture changes in velocity and acceleration, wheel revolution speed and distance for use by a Kalman filter to estimate position and orientation of the vehicle, steering angle for a dead-reckoning system, images for processing by an image sensor, vehicle position in global coordinates based on signals from a plurality of satellites, or any other data and/or signals that could be used to determine the current state of the vehicle, identify the driver, or determine the position of the vehicle 200 in respect to its environment.

For example, if the sensors 116 are configured to capture data for use by a LIDAR system, the sensors 116 can capture data related to laser returns from physical objects in the area surrounding the vehicle 200 with ranging distances calculated by measuring the time it takes for a signal to return to the sensor 116. Laser returns can include the backscattered light reflected by objects hit by a source of light, e.g. laser light, being emitted by the sensors 116 or another source on or proximate to the vehicle 200. Once the light is reflected by an object, the sensors 116 can capture intensity values and reflectivity of each point on the object to be used for analyzing and classifying the object. For example, the intensity values can be used to determine the distance to and position of the center line 204 and edge lines 206, 208 in respect to the vehicle 200.

The vehicle 200 can also include a plurality of vehicle interfaces 120 that allow the driver of the vehicle 200 to send commands to the vehicle controllers 118 and receive feedback from vehicle systems 117. For example, the vehicle interfaces 120 as shown in FIG. 2 can include a display screen, steering wheel, accelerator pedal, and brake pedal. Other vehicle interfaces 120 (not shown) can include audio controls, vehicle climate controls, or any other vehicle interface 120 allowing the driver to interact with the vehicle 200. In one example, when the vehicle interface 120 is a steering wheel, the driver can turn the steering wheel to the right or left to send a command to the steering and suspension system to turn the wheels of the vehicle 200 right or left. If the vehicle 200 position becomes too close to the center line 204 or edge lines 206, 208 of the road 202 as measured by the error detector 128, the steering and suspension system can also be configured to provide feedback to the driver through the steering wheel, for example, by a tactile response in the form of vibration.

Figure 3:
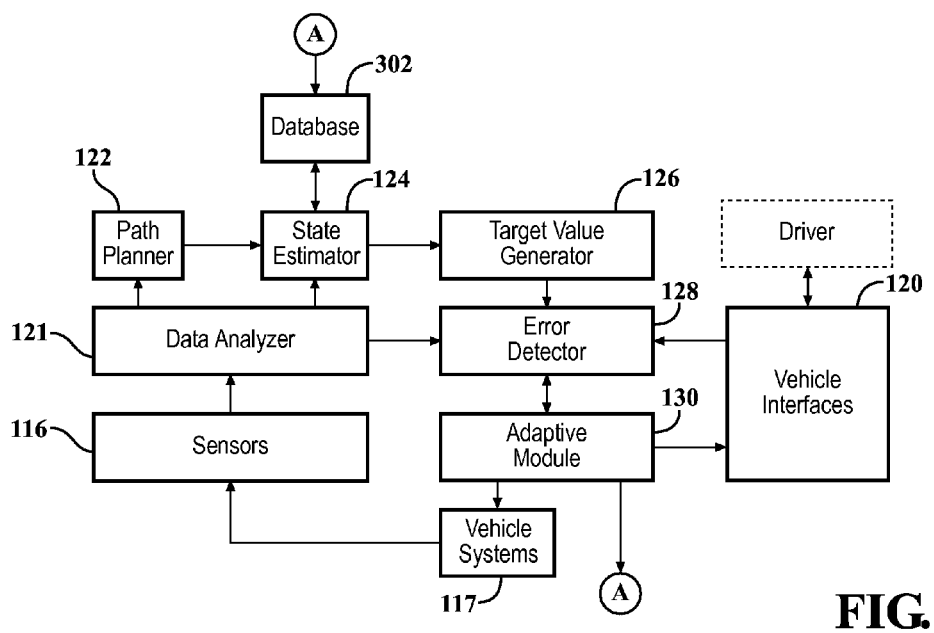
FIG. 3 is a schematic feedback loop of the interactive automated driving system implemented using the computing device of FIG. 1.

FIG. 3 is a schematic feedback loop of an interactive automated driving system 300 implemented using the computing device 100 of FIG. 1. The interactive automated driving system 300 includes the data analyzer 121 in communication with the one or more sensors 116. The data analyzer 121 can analyze the data and/or signals captured by the one or more sensors 116 by, for example, filtering noise, extracting features for clustering, and/or classifying and tracking objects. The data analyzer 121 can also report liability factors as various values and ranges to the state estimator 124 in order to optimize the target state of the vehicle based on the current state of the vehicle as is further described in reference to the state estimator 124 below. The data analyzer 121 processes data from the one or more sensors 116 such that the data is configured for use by the various applications 116 described below in respect to the interactive automated driving system 300.

The interactive automated driving system 300 also includes the path planner 122 shown in FIG. 1 in communication with the data analyzer 121. The path planner 122 is configured to determine a route for the vehicle 200 to follow based on its current location in respect to the surrounding environment. The path planner 122 determines the route for the vehicle based on data received from the data analyzer 121 and feeds the route information to the state estimator 124.

The state estimator 124 of the interactive automated driving system 300 is in communication with both the data analyzer 121 and the path planner 122. Again, the sensors 116 can be configured to capture data representative of the velocity, acceleration, deceleration, and position and orientation of the vehicle 200 in respect to its surrounding environment. The data captured by the sensors 116 can be analyzed using the data analyzer 121 and then used to determine one or more current values reflecting the vehicle state. Current values can include vehicle velocity, time-to-crossing of center line 204, distance to an object in front of the vehicle 200, or any other value related to the operation of the vehicle 200 along its planned path in respect to its environment. The state estimator 124 can also determine vehicle state based on the route information received from the path planner 122.

The state estimator 124 is also in communication with a database 302. The database 302 can include a plurality of state-specific reference values or ranges of values. The state-specific reference values include measures based on side-to-side, or lateral, travel of the vehicle 200 and front-to-rear, or longitudinal, travel of the vehicle 200. Example reference values can include measurements or ranges of lateral velocity, distance to center line 204, distance to edge lines 206, 208, time-to-crossing of center line 204, time-to-crossing of edge lines 206, longitudinal velocity, distance to object in front of the vehicle 200, distance to object in rear of the vehicle 200, time-to-collision with object in front of the vehicle 200, and time-to-collision with object in rear of the vehicle 200.

The state estimator 124 can be configured to compare current values based on data captured by the sensors 116 and analyzed by the data analyzer 121 to the ranges of reference values stored in the database 302 to determine the current vehicle state. As described above, vehicle states can include parking, lane-keeping, cruising along a highway, and start-and-stop traffic. One example operation of the state estimator 124 could include the state estimator 124 receiving current values indicative of low vehicle velocity or zero vehicle velocity (e.g., a stopped vehicle 200), alternating acceleration and deceleration of the vehicle 200, and short distances to objects in front of and in rear of the vehicle 200. The state estimator 124 could compare these (and other) current values to the ranges of reference values in the database 302 in order to determine that the vehicle 200 is operating in a stop-and-go traffic vehicle state.

The interactive automated driving system 300 also includes a target value generator 126 in communication with the state estimator 124. The target value generator 126 is configured to generate a target vehicle state based on the current vehicle state. The target vehicle state can include ranges of target values. Example target values include target heading for the vehicle 200, target cross-track offset for the vehicle 200, target distance to edge lines 206, 208, target longitudinal velocity for the vehicle 200, target acceleration or deceleration for the vehicle 200, and target distance to objects in front of or rear of the vehicle 200.

In one example, once the state estimator 124 has determined that the current vehicle state is stop-and-go traffic, the target value generator 126 can generate a target vehicle state that includes one or more ranges of target values consistent with safe, autonomous operation of the vehicle 200 in start-and-stop traffic. In addition, the target vehicle state can be designed to have different ranges of target values based on identification of the driver of the vehicle. For example, if the driver of the vehicle is a recently licensed driver, teen driver, or driver with a restricted license, the range of target values for target distance to objects in front of the vehicle 200 during stop-and-go traffic can include larger distance values than if the driver of the vehicle is an experienced driver with a clean driving record. As another example, if the purpose of the driver operating the vehicle 200 is to perform a job function (e.g. commercial truck driver, delivery driver), the ranges of target values can be designed to be more conservative than if the driver's purpose is one of operating a personal vehicle 200.

The interactive automated driving system 300 can also be configured such that the target value generator 126 communicates the ranges of target values to the error detector 128. The error detector 128 can compare current values received from the sensors 116 and analyzed by the data analyzer 121 to the ranges of target values from the target value generator 126 to determine if the current state lies within the ranges of the target state. If the current state is not consistent with the target state, the error detector 128 can communicate either through the adaptive module 130 (as shown) or directly with one or more vehicle systems 117 to change the state of the vehicle 200. The vehicle actuators 119 can be configured to receive commands from the vehicle controllers 118 in each vehicle system 117 to change the vehicle state from the current vehicle state to the target vehicle state if a current value falls outside of a range of target values.

For example, the sensors 116 can measure the current value of distance to an object in front of the vehicle 200. Based on both this measure and other current values, the state estimator 124 can determine that the vehicle 200 is operating in start-and-stop traffic. The target value generator 126 can then set a range for the target value of distance to an object in front of the vehicle 200 from "x" meters to "y" meters consistent with safe operation in start-and-stop traffic. If the vehicle 200 gets closer than "x" meters or further than "y" meters to an object in front of it while in the stop-and-go traffic vehicle state, a controller 118 can send a command to an actuator 119 to either engage the brakes (too close) or depress the accelerator pedal (too far). Alternatively, if the vehicle 200 remains within the range of "x" meters to "y" meters away from an object in front of it while in the stop-and-go traffic vehicle state, the controller 118 can be configured to send a command to an actuator 119 to maintain the current vehicle state.

The error detector 128 can also be configured to generate error messages if the current value falls outside the range of target values. These error messages can be communicated to the driver through the adaptive module 130, with the adaptive module 130 being configured to send commands regarding the error messages to vehicle systems 117 or vehicle interfaces 120 based on the communication from the error detector 128. Example error messages can include audible alerts, visual alerts, and tactile feedback provided to the driver of the vehicle 200 through vehicle interfaces 120 or vehicle systems 117.

For example, if an object in front of the vehicle 200 suddenly slows while operating the vehicle in start-and-stop traffic, and the change in distance to the object would correlate to a distance less than "x" for the target range of distance values falling between "x" and "y" meters, the error detector 128 can generate an error message including a command configured to provide an audible alert to the driver indicating the potential need for driver attention during autonomous operation. In another example, if another vehicle suddenly swerves toward the vehicle 200, the error detector 128 can generate an error message including a command configured to provide audible feedback to the driver in the form of an audible warning through the audio system, for example, warning the driver of the impending change to the vehicle state (e.g., the evasive maneuver).

Each of the prior-described examples in respect to FIG. 3 is consistent with fully autonomous operation of the vehicle 200 by the interactive automated driving system 300. In addition to fully autonomous operation, the interactive automated driving system 300 can be configured to operate based on driver inputs received at one or more vehicle interfaces 120. During fully autonomous operation of the vehicle 200, the driver can interact with a vehicle interface 120 with the intent of changing the state of the vehicle 200 from the target state to a desired state. For example, the driver may wish to engage the accelerator pedal during stop-and-go traffic autonomous operation to bring the vehicle 200 closer to an object (e.g., another vehicle) in front of the vehicle 200 if the driver prefers a closer spacing between the vehicle 200 and other vehicles.

Once the driver interacts with one or more vehicle interfaces 120, the interactive automated driving system 300 can communicate with the error detector 128 to generate one or more desired values corresponding to a desired vehicle state based on the driver input to the vehicle interface 120. The desired values reflect changes that could be made to vehicle values such as velocity and acceleration to change the position of the vehicle 200 in respect to its surrounding environment based on the driver input to the vehicle interface 120. Before sending any commands to the adaptive module 130 and vehicle systems 117 to implement any changes to the vehicle state, the interactive automated driving system 300 can use the error detector 128 to compare the desired values to one or more ranges of target values. Some indication of the comparison made between the desired state and target state can also be sent to the driver through one of the vehicle interfaces.

For example, the driver can engage the accelerator pedal during stop-and-go traffic to attempt to bring the vehicle 200 closer to another vehicle in front of the driver. The error detector 128 can then calculate the change in distance to the vehicle in front of the driver that would occur if the vehicle 200 were to accelerate at the rate requested based on the change in the accelerator pedal position caused by the driver. If the desired value, in this example, the distance to the vehicle in front of the driver, falls inside the range of target values provided by the target value generator 126 for the given vehicle state, for example, a range from "x" meters to "y" meters consistent with safe operation in start-and-stop traffic, the adaptive module 130 can send the desired vehicle state to the applicable vehicle system 117, in this example, the engine that includes a throttle plate for controlling airflow into the engine. The vehicle system 117 can then change the vehicle state from the target vehicle state to the desired vehicle state. In other words, if the driver depresses the accelerator pedal slightly while operating the vehicle 200 in start-and-stop traffic, and the change in position of the accelerator pedal would cause a change to the distance from an object in front of the vehicle 200 to stay between "x" and "y" meters, the adaptive module 130 can initiate the change in the vehicle state, in that it can send the desired vehicle state to the propulsion system for implementation.

In addition, once the driver engages the accelerator pedal during autonomous operation of the vehicle 200 in stop-and-go traffic, either the adaptive module 130 or error detector 128 can send an indication of the target state and the desired state to the driver through a vehicle interface 120. For example, a display can show the driver the current spacing between the vehicle 200 and an object in front of the driver as the current state and the proposed spacing between the vehicle 200 and an object in front of the driver as the desired state for monitoring purposes. The driver can use the information provided by the monitoring feature to confirm the desirability of the desired state or to change or stop the current driver input if the monitoring feature indicates a change that would not be desirable to the driver. The monitoring information can also be used to indicate to the driver that no change in vehicle state will occur despite the driver input, as would be the case in the next example.

If the desired value falls outside the range of target values, then the adaptive module 130 can send a command to the applicable vehicle system 117 to maintain the target vehicle state. For example, if the driver depresses the accelerator pedal while operating the vehicle 200 in a start-and-stop traffic vehicle state, and the change in position of the accelerator pedal would correlate to a distance less than "x" when the target range of distance values falls between "x" and "y" meters, the adaptive module 130 will not send the desired vehicle state to the propulsion system for implementation and can instead send a command to the vehicle system 117, e.g. the engine, to maintain the target vehicle state. The adaptive module 130 or error detector 128 can also send an indication that the desired value is beyond the acceptable range of values related to the target state, another form of monitoring information for use by the driver.

In another example, when a desired value falls outside the range of target values, the adaptive module 130 can send a command to the respective vehicle systems 117 to operate the vehicle 200 at one end of the range of target values, for example, the end of the range closest to the desired vehicle state as indicated by the driver input to the vehicle interface 120. Continuing the example from above, if the driver depresses the accelerator pedal while operating the vehicle in start-and-stop traffic, and the change in position of the accelerator pedal would correlate to a distance less than "x" for the target range of distance values falling between "x" and "y" meters, the adaptive module 130 can send a command to the vehicle system 117 to change the state of the vehicle 200 to have a distance near to, or equal to, "x" meters from an object in front of the vehicle 200.

In another example, when a desired value falls outside the range of target values, the adaptive module 130 can send a command to capture data related to the desired vehicle state and the one or more driver inputs generating the desired vehicle state and send that data to the memory 104 of the computing device 100. The stored data related to the driver inputs and desired vehicle state can be useful in optimizing the design of the target ranges and target states for particular drivers, in assisting authorities with accident reconstruction and accident fault determination, in performing vehicle diagnosis, etc.

The adaptive module 130 is also configured to learn driver behaviors and communicate with the database 302 as shown by the dotted-line arrows indicated with the letter "A" in FIG. 3. If one or more desired values satisfy a predetermined condition, the adaptive module 130 can send a command to the state estimator 124 through the database 302 to modify the target vehicle state to reflect the desired vehicle state. For example, the predetermined condition can be that one of the driver inputs received at one of the vehicle interfaces 120 includes a command to update the target vehicle state to reflect the desired vehicle state. This driver input can be received through a switch, button, voice command, or any other means for the driver to indicate to the adaptive module 130 that the desired state is to be learned by the interactive automated driving system 300 and that the target state is to be updated to reflect this desired state in the database 302 and the state estimator 124.

Continuing the example from above, if the driver depresses the accelerator pedal while operating the vehicle in start-and-stop traffic, and the change in position of the accelerator pedal would correlate to a distance within the target range of distance values, and the driver flips a designated switch to communicate the driver's desire for the system 300 to learn the desired value, the adaptive module 130 can send a command to the vehicle system 117 to change the state of the vehicle 200 to the desired state and send a command to the database 302 and state estimator 124 to update the target state to reflect the desired state. By learning desired states within target ranges, the adaptive module 130 and state estimator 124 are designed to minimize the amount of interaction needed to update autonomous operation to driver preferences. Once the driver has met the predetermined condition, in this example, by flipping a switch commanding the adaptive module 130 to learn the desired value, the driver will not need to teach the system that preference again for the given vehicle state.

In another example, the predetermined condition can be that one of the driver inputs has been received more than a predetermined number of times within a predetermined time period for a given target vehicle state. For example, during autonomous operation in a vehicle state of cruising along the highway, the driver can turn the steering wheel in an effort to move the vehicle 200 closer to edge line 208 as shown in FIG. 2. If the distance to the edge line 208 is within an acceptable target range of distances, the interactive automated driving system 300 will command the applicable vehicle system 117 to execute the change. However, the vehicle can subsequently drift back toward the center of the existing target range of distances. If the driver turns the steering wheel with the intent of moving the vehicle 200 closer to the edge line 208 several times within a set period of time, the adaptive module 130 can send a command to the state estimator 124 to update the target range to reflect the desired value. Once learned, the driver will not need to turn the steering wheel to maintain the preferred distance to the edge line 208 for the vehicle state of cruising along the highway.

In another example, the predetermined condition can be that one of the driver inputs lasts for a predetermined time period within a given vehicle state. As an alternative to the previous example, during autonomous operation in a vehicle state of cruising along the highway, the driver can turn the steering wheel and hold the steering wheel in a turned position in an effort to maintain the position of the vehicle 200 as closer to edge line 208. After the driver has held this input for a predetermined amount of time, the adaptive module 130 can send a command to the state estimator 124 to update the target range of distances to reflect the desired distance value based on the driver's input. Finally, the predetermined condition can be a combination of the last two examples. The same driver input lasting a predetermined time period can be received more than a predetermined number of times within a time period for a given vehicle state.

The interactive automated driving system 300 operates in a feedback loop as shown in FIG. 3. After one or more vehicle systems 117 implement a change in the operation of the vehicle 200, for example, the vehicle 200 changes from the current vehicle state to the target vehicle state or the target vehicle state to the desired vehicle state, the sensors 116 can once again measure one or more vehicle values and send the data to the data analyzer 121 for use by the state estimator 124. As the feedback loop operates, the interactive automated driving system 300 can learn the behaviors of a given driver and change the ranges of target values based on vehicle design constraints, the identification of the driver operating the vehicle 200, and/or repeated or prolonged inputs from the driver. As the range of target values changes to more closely fit the driver's behavior, the driver can become more satisfied with the operation of the interactive automated driving system 300. Once the driver is satisfied, the driver can decrease interaction with the vehicle interfaces 120 and allow the vehicle 200 to operate more often in a fully autonomous manner.

Figure 4:
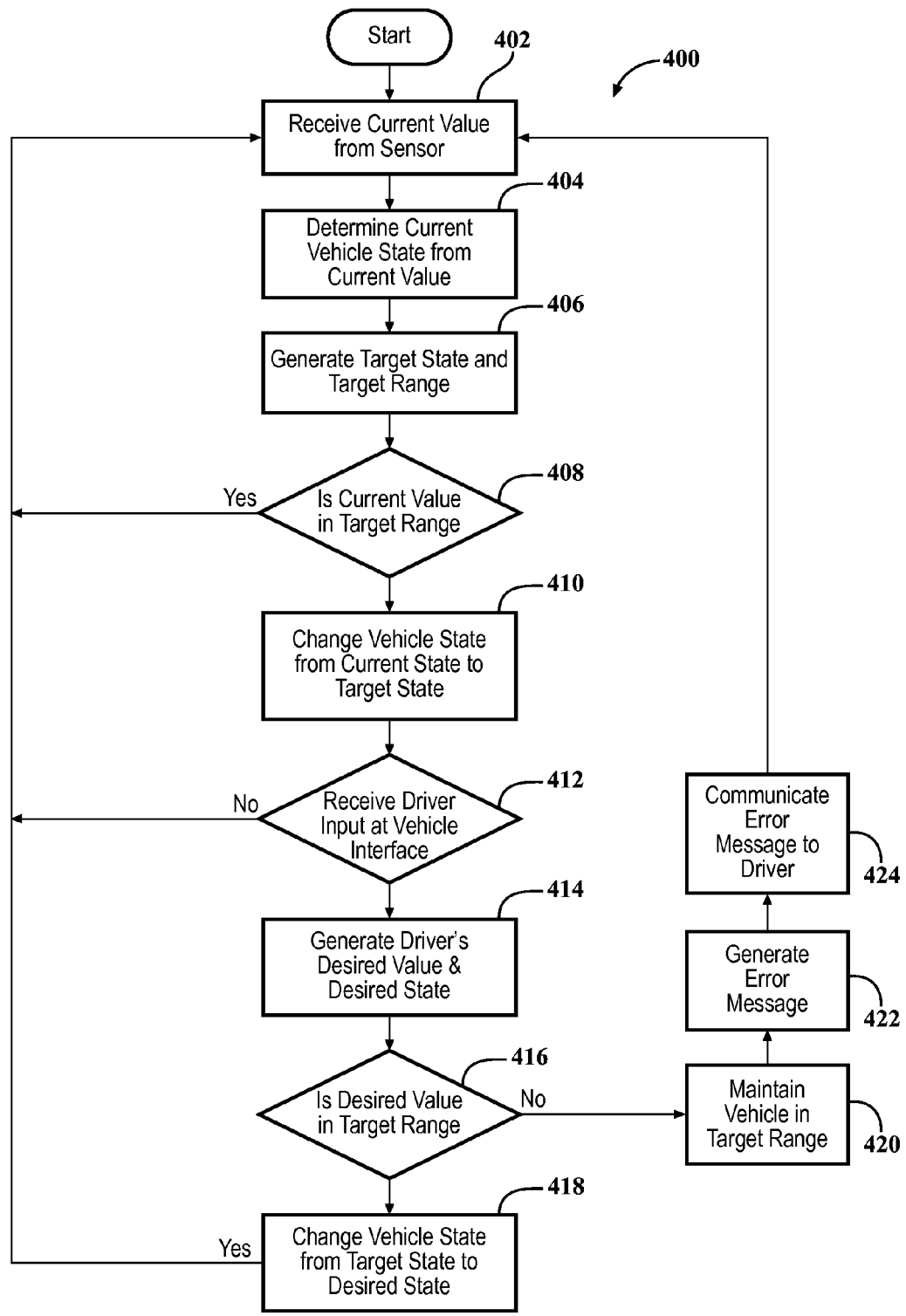
FIG. 4 is a logic flowchart of a process performed by the interactive automated driving system of FIG. 3.

FIG. 4 is a logic flowchart of a process 400 performed by the interactive automated driving system 300 of FIG. 3. In step 402 of the process, the interactive automated driving system 300 can receive a current value corresponding to a current vehicle state from one or more sensors 116 disposed on the vehicle 200 as shown in FIG. 2 through the data analyzer 121. For example, current values can include such measures as vehicle velocity, acceleration, deceleration, position, and orientation. In step 404 of the process 400, the interactive automated driving system 300 can determine the current vehicle state based on the current value. For example, a low vehicle velocity and repeated instances of acceleration and deceleration could indicate that the vehicle is operating in a stop-and-go traffic current vehicle state.

In step 406, the interactive automated driving system 300 can generate a target vehicle state based on the current vehicle state. The target vehicle state can include one or more ranges of target values. The ranges of target values can be based on vehicle design constraints, classification of the driver of the vehicle, and/or various inputs provided by the driver of the vehicle. The vehicle design constraints can include safety considerations and range limitations based on physical limitations of the vehicle. The classification of the driver can include the identification of the driver, the age of the driver (e.g. very young or very old), whether there are any restrictions on the license of the driver (e.g. restricted or unrestricted), and whether the driver is authorized for vehicle operation (e.g. authorized for personal use or authorized for specific job function). For example, if the driver is a teenager, the range of target values associated with the distance to an object in front of the vehicle can have larger overall values than if the driver is an experienced, middle-aged driver with a clean driving record.

In decision block 408 of the process 400, the interactive automated driving system 300 can determine whether the current value falls inside or outside the range of target values. If the current value falls inside the range of target values, the vehicle can be maintained in the current vehicle state, and the process 400 can loop back to step 402 to receive a new current value. If the current value falls outside the range of target values, the interactive automated driving system 300 can send the target vehicle state to one or more vehicle systems 117. In step 410 of process 400, the one or more vehicle systems 117 can change the vehicle state from the current vehicle state to the target vehicle state. Each of the above-described steps and decision blocks (402, 404, 406, 408, 410) in the process 400 is consistent with fully autonomous operation of the vehicle 200.

In decision block 412 of the process 400, the interactive automated driving system 300 can determine whether a driver input has been received at one or more of the vehicle interfaces 120. If no driver input is received at a vehicle interface 120, the process 400 can loop back to step 402 to receive a new current value. If a driver input is received at one or more vehicle interfaces 120, the interactive automated driving system 300 can generate a desired value corresponding to a desired vehicle state in step 414. The desired state can be based on the one or more driver inputs received at the one or more vehicle interfaces 120. As described above, a desired value is generated to represent changes that could be made to such measures as vehicle velocity and vehicle acceleration to change the position of the vehicle 200 in respect to its surrounding environment based on the driver input to the vehicle interface 120.

In decision block 416 of the process 400, the interactive automated driving system 300 can determine whether the desired value falls inside or outside the range of target values. If the desired value falls inside the range of target values, the interactive automated driving system can send the desired vehicle state to one or more vehicle systems 117 for implementation. In step 418 of the process, the one or more vehicle systems 117 can be configured to change the vehicle state from the target vehicle state to the desired vehicle state. If the vehicle state is changed from the target vehicle state to the desired vehicle state, the process 400 loops back to step 402 to receive the next current value.

As described above, the interactive automated driving system 300 can also change the ranges of target values within vehicle constraints and driver-specific restrictions when it receives patterns of inputs from the driver correlating to desired vehicle states that differ from the target vehicle states. For example, a range of target values can be adapted to weight a desired value, based on driver inputs, more heavily within the range. This weighting moves the autonomous operation of the vehicle toward the desired value, learning the preferences of the driver within vehicle constraints and driver-specific restrictions.

If the desired value falls outside of the range of target values, the interactive automated driving system 300 can send a command to one or more vehicle systems 316 to maintain the target vehicle state in step 420. The interactive automated driving system 300 can also generate an error message in step 422 if the vehicle 200 is maintained in the target vehicle state. In step 424, the interactive automated driving system 300 can communicate the error message to the driver by sending the error message to at least one vehicle interface 120. As described above, the error message can include a command configured to send an audible alert, a visual alert, or tactile feedback to the driver using at least one vehicle interface 120. Once the error message is communicated to the driver in step 424, the process 400 loops back to step 402 to receive another current value, and the cycle repeats.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle 200 is generally described an automobile. However, the vehicle 200 is not limited to an automobile, as the interactive automated driving system 300 could also be implemented with other vehicles generally controlled by a driver, or operator, such as airplanes, boats, etc. The scope of the claims is to be accorded the broadest interpretation so as to encompass all such modifications and equivalent structures as is permitted under the law.

What is claimed is:

1. An interactive automated driving system, comprising:
one or more sensors disposed on a vehicle; and
a computing device in communication with the one or more sensors, comprising:
one or more processors for controlling the operations of the computing device; and
a memory for storing data and program instructions used by the one or more processors, wherein the one or more processors are configured to execute instructions stored in the memory to:
determine a current vehicle state based on a current value captured by the one or more sensors wherein the current vehicle state includes one of parking, turning, lane keeping, lane changing, cruising, accelerating, decelerating, and start-and-stop traffic;
generate a range of target values associated with operation of the vehicle in the current vehicle state wherein the target values include one of times, accelerations, decelerations, velocities, and distances;
receive, from a driver of the vehicle at one or more vehicle interfaces, one or more driver inputs during operation of the vehicle in the current vehicle state, the one or more driver inputs being related to a control of one or more vehicle systems;
generate a desired value based on the one or more driver inputs, the desired value representing a change to be made to the one or more vehicle systems as desired by the driver;
if the desired value falls inside the range of target values for the current vehicle state, send a command to the one or more vehicle systems to change an operation of the one or more vehicle systems based on the desired value; and
if the desired value falls outside the range of target values for the current vehicle state, either send a command to the one or more vehicle systems to maintain the current vehicle state, or ignore the one or more driver inputs received at the one or more vehicle interfaces.

2. The interactive automated driving system of claim 1, wherein the processor is further configured to:
if the one or more driver inputs satisfy a predetermined condition, modify the range of target values to reflect the desired value.

3. The interactive automated driving system of claim 2, wherein the predetermined condition is that one of the driver inputs received at one of the vehicle interfaces includes a command to update the range of target values to reflect the desired value.

4. The interactive automated driving system of claim 2, wherein the predetermined condition is that one of the driver inputs has been received more than a predetermined number of times within a predetermined time period.

5. The interactive automated driving system of claim 2, wherein the predetermined condition is that one of the driver inputs lasts for a predetermined time period.

6. The interactive automated driving system of claim 1, wherein the processor is further configured to:
if the desired value falls outside the range of target values, capture and record data related to the one or more driver inputs generating the desired value in the memory.

7. The interactive automated driving system of claim 1, wherein the processor is further configured to:
if the desired value falls outside the range of target values, generate an error message and send the error message to at least one vehicle interface.

8. The interactive automated driving system of claim 7, wherein the error message includes a command configured to send at least one of an audible alert, tactile alert, and visual alert to the driver.

9. The interactive automated driving system of claim 1, wherein the range of target values is based on vehicle design constraints.

10. The interactive automated driving system of claim 1, wherein the range of target values is based on classification of the driver of the vehicle.

11. The interactive automated driving system of claim 10, wherein the classification of the driver includes at least one of verified identification, age, license restriction, and authorization for vehicle operation.

12. The interactive automated driving system of claim 1, wherein the processor is further configured to:
send a command to one or more vehicle systems to provide information to the driver monitoring the desired value and the target values.

13. The interactive automated driving system of claim 1, wherein the processor is further configured to:
if the current value falls outside the range of target values, send a command to one or more vehicle systems to change operation of the vehicle to be within the range of target values.

14. A computer-implemented method of interactive automated driving, comprising:

receiving, from one or more sensors disposed on a vehicle, a current value;

determining a current vehicle state based on the current value wherein the current vehicle state includes one of parking, turning, lane keeping, lane changing, cruising, accelerating, decelerating, and start-and-stop traffic;

generating a range of target values associated with operation of the vehicle in the current vehicle state wherein the target values include one of times, accelerations, decelerations, velocities, and distances;

receiving, from a driver of the vehicle at one or more vehicle interfaces, one or more driver inputs during operation of the vehicle in the current vehicle state, the one or more driver inputs being related to a control of one or more vehicle systems;

generating a desired value based on the one or more driver inputs, the desired value representing a change to be made to the one or more vehicle systems as desired by the driver;

if the desired value falls inside the range of target values for the current vehicle state, sending a command to the one or more vehicle systems to change an operation of the one or more vehicle systems based on the desired value; and if the desired value falls outside the range of target values for the current vehicle state, either send a command to the one or more vehicle systems to maintain the current vehicle state, or ignore the one or more driver inputs received at the one or more vehicle interfaces.

15. The method of claim 14, further comprising:

if the one or more driver inputs satisfy a predetermined condition, modifying the range of target values to reflect the desired value.

16. The method of claim 14, further comprising:

if the desired value falls outside the range of target values, generating an error message and sending the error message to at least one vehicle interface.

17. A computing device, comprising:

one or more processors for controlling the operations of the computing device; and a memory for storing data and program instructions used by the one or more processors, wherein the one or more processors are configured to execute instructions stored in the memory to:

receive, from one or more sensors disposed on a vehicle, a current value;

determine a current vehicle state based on the current value wherein the current vehicle state includes one of parking, turning, lane keeping, lane changing, cruising, accelerating, decelerating, and start-and-stop traffic;

generate a range of target values associated with operation of the vehicle in the current vehicle state wherein the target values include one of times, accelerations, decelerations, velocities, and distances;

receive, from a driver of the vehicle at one or more vehicle interfaces, one or more driver inputs during operation of the vehicle in the current vehicle state, the one or more driver inputs being related to a control of one or more vehicle systems;

generate a desired value based on the one or more driver inputs, the desired value representing a change to be made to the one or more vehicle systems as desired by the driver;

if the desired value falls inside the range of target values for the current vehicle state, send a command to the one or more vehicle systems to change an operation of the one or more vehicle systems based on the desired value; and if the desired value falls outside the range of target values for the current vehicle state, either send a command to the one or more vehicle systems to maintain the current vehicle state, or ignore the one or more driver inputs received at the one or more vehicle interfaces.

18. The computing device of claim 17, wherein the processor is further configured to:

if the one or more driver inputs satisfy a predetermined condition, modify the range of target values to reflect the desired value.

* * * * *